Aug. 26, 1924.

A. WALTER

TERMINAL POST SEAL

Filed Sept. 15, 1921

1,506,466

Inventor;
Anton Walter,
By Byrne Townsend & Brickenstein
Attorneys.

Patented Aug. 26, 1924.

1,506,466

UNITED STATES PATENT OFFICE.

ANTON WALTER, OF INDIANAPOLIS, INDIANA, ASSIGNOR TO THE PREST-O-LITE COMPANY, INC., A CORPORATION OF NEW YORK.

TERMINAL-POST SEAL.

Application filed September 15, 1921. Serial No. 500,788.

*To all whom it may concern:*

Be it known that I, ANTON WALTER, a citizen of the United States, residing at 1827 Koehne St., Indianapolis, in the county of Marion and State of Indiana, have invented certain new and useful Improvements in Terminal-Post Seals, of which the following is a specification.

This invention relates to an improved terminal post seal for storage batteries.

Heretofore, in some types of storage batteries the space above the joint between the post and the opening in the cell cover has been filled with sealing compound which, when first applied, adheres strongly to the post and prevents the escape of the electrolyte. During the operation of the battery, the bond between the sealing compound and the post gradually loosens and the electrolyte finally creeps out between the compound, the post and the cover. The object of this invention is, accordingly, to provide simple and effective means for securing and sealing a terminal post in a battery cell cover that will indefinitely maintain liquid tight joints between the sealing means, the terminal post, and the cover.

Broadly speaking, the improved securing and sealing means consists solely of a ring or bushing, the post-receiving passage of which is similar in cross section to that of the part of the post to which it is applied, but is of slightly smaller size so that by forcing the ring onto the post it will closely and tightly surround and grip the same and bear against the cover to hold the terminal post in place and also seal the joints between it, the cover and the terminal post. The improved ring or bushing is desirably made of hard rubber which is non-corrodible and slightly yieldable when cold, and yieldable to a greater degree when warmed, whereby the post-receiving passage of the ring will expand to the size desired and remain under substantially constant tension around the post during all changes in temperature and operating conditions.

Figure 1:
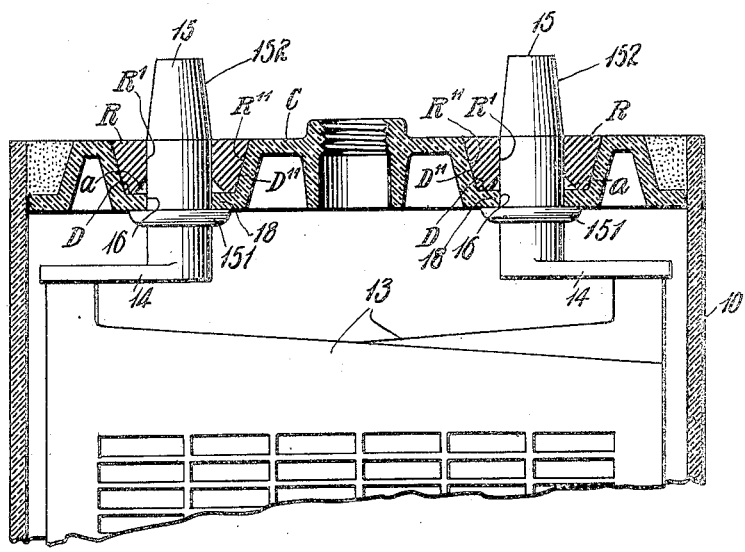
Figure 2:
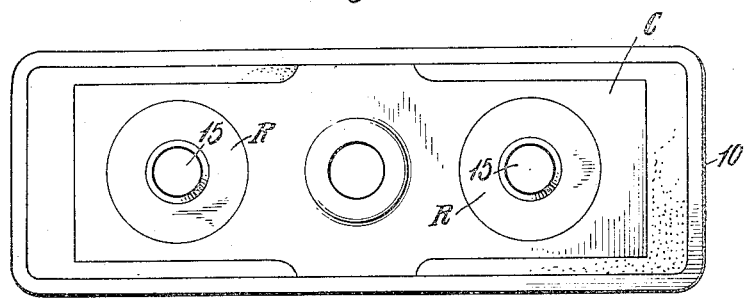

The above and other objects and the novel features of the invention will be apparent from the following description taken in connection with the drawing, in which Figs. 1 and 2 are, respectively, a central vertical sectional view and a plan view of a portion of a storage battery cell having the improved securing and sealing means applied to the terminal posts and cover thereof.

In the drawings which illustrate one embodiment of the invention, the usual cell jar 10 contains the electrolyte and the usual positive and negative plates 13 which have connector straps 14 united to positive and negative lead terminal posts 15 projecting through openings 16 in a hard-rubber cell cover C. The terminal posts may be provided with collars 151 adapted to bear against the inner side of the cover, either with or without a gasket interposed between such collar and the cover.

The terminal posts are both secured in their respective openings in the cover in the same manner, therefore a description of one securing and sealing means will be sufficient. As illustrated, the sole means for securing and sealing the post 15 in its opening 16 consists of a ring or bushing R of hard rubber or similar material that is non-corrodible and normally comparatively rigid but is slightly yieldable when cold and somewhat more so when warmed. Initially or before being applied to the terminal post the ring R has a central post-receiving passage R' that is of a cross-section similar to but slightly smaller than the part of the post to which the ring is finally applied. The passage R' is desirably smooth inside and the ring may be applied to the post in a suitable press adapted to force the ring axially downwardly along the post until it bears against the upper side of the cover adjacent the hole 16 and draws the flange 151 against the lower side of the cover. If desired, a gasket may be interposed between the cover and the lower side of the ring. By forcing the ring onto the post the hole R' is slightly expanded and stresses are set up in the hard rubber which, because of the inherent resiliency of the material, will maintain a high degree of adhesion between the ring and post during variations in temperature and operating conditions to prevent leakage of electrolyte between the post and ring and between the ring and cover. In order to facilitate the assembling of the bushing or ring on the post, the bushing may be provided with a chamfer $a$ at the lower end of the passage R' thereof so that such passage and the adjoining part of the bushing may be gradually expanded. After the bushing has been applied to the post a suitable connector may be attached to or lead burned onto the upper end 152 thereof.

The cell cover C may be molded or otherwise formed of hard rubber or similar material, and is provided with tapering depressions D in its upper surface which, as previously stated, were formerly filled with sealing composition to seal the joints between the posts and the cover. In the improved construction herein shown, the holes 16 are formed at the bottoms of these depressions, leaving flanges 18 against which the securing and sealing rings R may bear. The ring R is relatively thick and wide to prevent breakage and substantially fills the annular space between the post and the wall D'' of the depression, the outer side R'' being inc'ined to correspond with the inclined surface of the wall D''. The opposed surfaces of the rings and the walls of the depressions may be coated with acid-resistant paint and the surfaces may be roughened to further increase the tightness of the joints.

The cross-sectional shape of the terminal posts may be circular, as shown, or other than circular if desired, without departing from the present invention. The cross-sectional shape of the depressions and the sealing rings or bushings will, of course, be made of a corresponding shape. In the improved seal, the hard rubber sealing rings or bushings, which are force-fitted on the terminal posts, serve as the sole means for securing and sealing the posts in place in the cover and prevent the escape of the electrolyte at the joints between the post and cover.

I claim:

1. The combination with a storage battery cover having an opening therethrough, of a terminal post projecting through said opening and a hard rubber bushing securing said post in said opening and having a post-receiving passage initially of a cross-sectional size smaller than any part of said post to which it is finally applied, said bushing being force-fitted on said post thereby enlarging said passage and stressing the walls thereof so as to cause said post to be firmly gripped and held in place by said bushing.

2. The method of securing a terminal post in an opening in a storage battery cover through which it projects that comprises forcing onto said post a hard rubber bushing that has a post-receiving passage initially of a cross-sectional size smaller than the part of said post which it finally engages, whereby said bushing is force-fitted on said post and said passage is enlarged, stressing the walls thereof so that said post is firmly gripped and held in place by said bushing.

3. The method of securing a terminal post in an opening in a storage battery through which it projects that comprises forcing onto said post a heated hard rubber bushing that has a post-receiving passage initially of a cross-sectional size smaller than the part of said post which it finally grips, whereby said bushing is force-fitted on said post and said passage is enlarged, stressing the inherently resilient walls thereof so that said post is tightly gripped and held in place solely by said bushing.

4. The combination with a storage battery cover having a depression and an opening through said cover at the bottom of said depression, of a terminal post projecting through said opening, and means for securing and sealing said post in said opening comprising a ring-like hard rubber bushing force-fitted on said post and bearing against the bottom of said depression.

In testimony whereof, I affix my signature.

ANTON WALTER.